(12) United States Patent
Butler et al.

(10) Patent No.: US 9,182,771 B2
(45) Date of Patent: Nov. 10, 2015

(54) VOLTAGE REGULATION OF NEAR FIELD COMMUNICATION COMMUNICATORS

(75) Inventors: Paul Butler, Chippenham (GB); David Miles, Gloucestershire (GB); Robin Wilson, Gloucestershire (GB)

(73) Assignee: Broadcom Europe Limited, London (GB)

( * ) Notice: Subject to any disclaimer, the term of this patent is extended or adjusted under 35 U.S.C. 154(b) by 406 days.

(21) Appl. No.: 13/130,365

(22) PCT Filed: Nov. 26, 2009

(86) PCT No.: PCT/GB2009/051605
§ 371 (c)(1),
(2), (4) Date: Sep. 1, 2011

(87) PCT Pub. No.: WO2010/061224
PCT Pub. Date: Jun. 3, 2010

(65) Prior Publication Data
US 2011/0306295 A1 Dec. 15, 2011

(30) Foreign Application Priority Data
Nov. 26, 2008 (GB) .................................. 0821628.5

(51) Int. Cl.
H04B 5/00 (2006.01)
G05F 1/613 (2006.01)
H02J 5/00 (2006.01)

(52) U.S. Cl.
CPC ................. *G05F 1/613* (2013.01); *H02J 5/005* (2013.01); *H04B 5/0037* (2013.01); *H04B 5/0081* (2013.01)

(58) Field of Classification Search
CPC .... G05F 1/613; H04B 5/0037; H04B 5/0081; H02J 5/005

USPC .......... 455/41.1; 363/125; 323/222, 223, 312, 323/316
See application file for complete search history.

(56) References Cited

U.S. PATENT DOCUMENTS

| | | | | |
|---|---|---|---|---|
| 4,714,901 A * | 12/1987 | Jain et al. | ...................... | 331/176 |
| 5,578,960 A * | 11/1996 | Matsumura et al. | .......... | 327/535 |
| 6,104,179 A * | 8/2000 | Yukawa | ........................ | 323/316 |
| 6,134,130 A * | 10/2000 | Connell et al. | .................. | 363/89 |
| 6,630,858 B1 * | 10/2003 | Takabayashi | ................. | 327/538 |

(Continued)

FOREIGN PATENT DOCUMENTS

| | | |
|---|---|---|
| DE | 11 2009 003 513 | 6/2012 |
| EP | 1 852 767 A1 | 11/2007 |

(Continued)

OTHER PUBLICATIONS

Floyd, Thomas L., Electronic Devices, 2005, Pearson Prentice Hall, 7th ed.*

(Continued)

*Primary Examiner* — Gennadiy Tsvey
(74) *Attorney, Agent, or Firm* — Sterne, Kessler, Goldstein & Fox P.L.L.C.

(57) ABSTRACT

A NFC enabled device to couple inductively to the H field of an RF signal and a regulator to regulate a voltage derived from an RF signal inductively coupled to the inductive coupler. The regulator has at least one voltage controlled impedance having a switch on voltage. A regulator controller provides a control voltage to each voltage controlled impedance such as that the control voltage is not less than the switch on voltage of the voltage controlled impedance.

23 Claims, 4 Drawing Sheets

(56) References Cited

U.S. PATENT DOCUMENTS

| | | | |
|---|---|---|---|
| 7,289,149 B1* | 10/2007 | Lee et al. | 348/300 |
| 2002/0070772 A1 | 6/2002 | Neacsu et al. | |
| 2002/0097144 A1* | 7/2002 | Collins et al. | 340/333 |
| 2003/0197598 A1* | 10/2003 | Hayashi | 340/310.07 |
| 2005/0104573 A1* | 5/2005 | Smith et al. | 323/312 |
| 2005/0162145 A1* | 7/2005 | Smith et al. | 323/312 |
| 2006/0192611 A1* | 8/2006 | Bonaccio et al. | 327/543 |
| 2007/0026826 A1* | 2/2007 | Wilson | 455/130 |
| 2007/0052396 A1* | 3/2007 | Kerth et al. | 323/223 |
| 2007/0290660 A1* | 12/2007 | Yamazaki | 323/222 |
| 2008/0246667 A1 | 10/2008 | Symons | |
| 2008/0272889 A1 | 11/2008 | Symons | |

FOREIGN PATENT DOCUMENTS

| | | |
|---|---|---|
| EP | 1 959 580 A1 | 8/2008 |
| GB | 2 444 180 A | 5/2008 |
| GB | 2 465 678 A | 6/2010 |
| WO | WO 2006/003460 A1 | 1/2006 |
| WO | WO 2008/117029 A2 | 10/2008 |
| WO | WO 2009/063214 A1 | 5/2009 |
| WO | WO 2010/061224 A2 | 6/2010 |

OTHER PUBLICATIONS

ATIS Telecom Dictionary, located at http://www.atis.org/glossary/definition.aspx?id=5060, retrieved on Dec. 23, 2014.*

Definition of "Ground" from Wikipedia, located at http://en.wikipedia.org/wiki/Ground_(electricity), retrieved on Dec. 23, 2014.*

Turner, R. P., Gibilisco, S., The Illustrated Dictionary of Electronics, 1991, McGraw-Hili, Inc., p. 279.*

International Standard: ISO/IEC 21481, *Information technology—Telecommunications and information exchange between systems—Near Field Communication Interface and Protocol—2(NFCIP-2)*, pp. 1-12, First edition, Reference No. ISO/IEC 21481:2005(E), ISO/IEC (Jan. 2005).

International Standard: ISO/IEC 18092, *Informtion technology—Telecommunications and information exchange between systems—Near Field Communication—Interface and Protocol (NFCIP-1)*, pp. 1-66, First edition, Reference No. ISO/IEC 18092:2004(E), ISO/IEC (Apr. 2004).

International Standard: ISO/IEC 14443, *Identification cards—Contactless integrated circuit cards—Proximity cards, Part 4: Transmission protocol*, pp. 1-46, Second edition, Reference No. ISO/IEC 14443-4:2008(E), ISO/IEC (Jul. 2008).

International Standard: ISO/IEC 15693, *Identification cards—Contactless integrated circuit cards—Vicinity cards—Part 3: Anticollision and transmission protocol*, pp. 1-51, First edition, Reference No. ISO/I EC 15693-3:2001 (E), ISO/IEC (Apr. 2001).

International Search Report and Written Opinion directed toward related International Patent Application No. PCT/GB2009/051605, European Patent Office, Rijswijk, Netherlands, mailed on Feb. 28, 2011; 12 pages.

International Preliminary Report on Patentability directed toward related International Patent Application No. PCT/GB2009/051605, The International Bureau of WIPO, Geneva, Switzerland, mailed on May 31, 2011; 7 pages.

* cited by examiner

VOLTAGE REGULATION OF NEAR FIELD COMMUNICATION COMMUNICATORS

CROSS-REFERENCE TO RELATED APPLICATIONS

This application is a National Stage of International Application No. PCT/GB2009/051605, filed on Nov. 26, 2009, which claims the benefit of Great Britain Patent Application No. 0821628.5.

BACKGROUND

1. Field of Invention

This invention relates to NFC enabled devices, and specifically to protecting NFC enabled devices from damaging voltages.

2. Related Art

Near field communications (NFC) requires that NFC devices be within a relatively small distance from one another so that their corresponding magnetic fields can exchange information. Ranges of up to several centimeters (generally a maximum of 1 meter) are common for NFC devices. Typically, a first NFC device transmits or generates a magnetic field modulated with the information, such as the credit information or the ticket fare information. This magnetic field inductively couples onto a second NFC device that is proximate to the first NFC device. The second NFC device may respond to the first NFC device by transmitting or generating its own modulated magnetic field and inductively coupling this magnetic field to the first NFC device. There are several standards in existence which set out certain communication protocols and functional requirements for NFC and other communications using the near field, such as ISO/IEC 14443, ISO 15693, ISO/IEC 18092 and ISO/IEC 21481.

A NFC enabled device is a type of NFC device that is capable of operating in an initiator mode to initiate a communication with another NFC enabled device and in a target mode to respond to the initiation of a communication by another NFC enabled device. The term "NFC enabled device" includes not only the NFC enabled device but also other initiator NFC enable devices, such as a RFID transceiver or reader that are capable of initiating a near field RF communication and/or a RFID transponder or tag that are capable of responding to initiation of a NFC by another NFC enabled device to provide some examples. Hence, the NFC enabled device can act as both a RFID transceiver and a RFID transponder and are able to communicate with other NFC enabled devices, RFID transceivers and RFID transponders.

In addition, NFC enabled devices may be associated with or comprised within or attached to certain peripheral devices, for example SIM cards (e.g. UICC), secure elements, memory devices (for example MCU, RAM, ROM and non-volatile memory), display driver or other drivers. During operation the NFC enabled device must also be able to communicate with and transfer data to and from such peripheral device.

Components of NFC enabled devices are generally protected from damaging voltages by voltage regulators such as shunt regulators. These regulators may have a finite response time during which components of the NFC enabled device are exposed to damaging voltages.

An aspect of the present invention provides a NFC enabled device that alleviates at least some of the aforementioned problems. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these. The NFC enabled device may be provided wholly or partially as an integrated circuit or collection(s) of integrated circuits.

Communication Between Two NFC Enabled Devices

Figure 1:
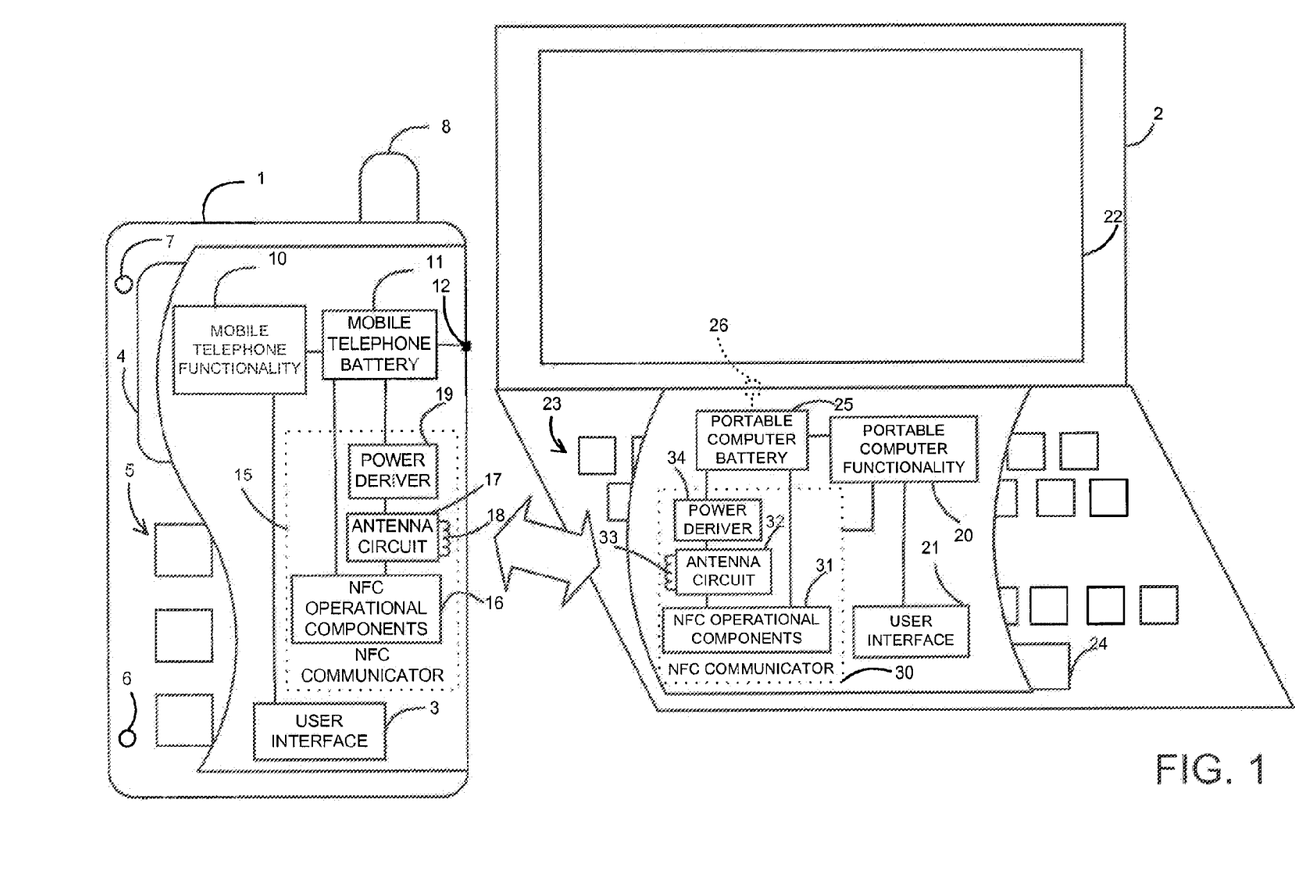
FIG. 1 illustrates a representational diagram illustrating communication between two NFC enabled devices.

Referring now specifically to FIG. 1, there is shown a representational diagram illustrating communication between two NFC enabled devices. The representations of NFC enabled devices as shown in FIG. 1 have been shown partly cut-away and functionalities provided by these NFC enabled devices are illustrated by way of a functional block diagram within each of the NFC enabled devices.

As shown in FIG. 1, a first NFC enabled device may represent a mobile telephone 1 and a second NFC enabled device may represent a portable computer 2, such as a notebook or laptop computer to provide some examples.

The mobile telephone 1 has the usual features of a mobile telephone including mobile telephone functionality 10 for controlling operation of the mobile telephone 1, an antenna 8 for enabling connection to a mobile telecommunications network, and a user interface 3 with a display 4, a keypad 5, a microphone 6, and a loudspeaker 7. The mobile telephone also has a chargeable battery 11 coupled to a charging socket 12 to enable charging of the chargeable battery 11. The mobile telephone 1 may have an alternative or additional power supply (not shown in FIG. 1), for example a reserve battery or emergency battery.

Similarly the portable computer 2 has the usual features of a portable computer including portable computer functionality 20 such as a processor with associated memory such as ROM, RAM and/or hard disk drive, one or more removable media drives such as a floppy disk drive and/or a CDROM or DVD drive, and/or a communications device for enabling the portable computer 2 to connect to a network. The portable computer 2 also includes a user interface 21 including a display 22, a keyboard 23, and a pointing, device, as shown a touchpad 24. The portable computer 2 also has a chargeable battery 25 coupled to a charging socket 26 to enable charging of the chargeable battery 25.

In addition, as shown in FIG. 1, the mobile telephone 1 and the portable computer 2 include a NFC communicator 15 and a NFC communicator 30, respectively. The NFC communicators 15 and 30 are incorporated within the mobile telephone 1 and the portable computer 2, respectively, as with the other functional blocks, may be discrete entities within the mobile telephone 1 or the portable computer 2, or may be provided by features dispersed throughout or integrated within or a part of the mobile telephone 1 or the portable computer 2.

As shown in FIG. 1, the NFC communicators 15 and 30 include NFC operational components 16 and 31, respectively, for, as will be described below, enabling control of the NFC functionality and generation, modulation, and demodulation of a communications signal. The NFC communicators 15 and 30 also include an antenna circuit 17 and 32, respectively. The antenna circuits 17 and 32 include an inductive coupling element, such as inductor or coil to provide some examples, in the form of an antenna 18 and 33, respectively.

The NFC communicators 15 and 30 interact with each other to exchange information such as data and/or one or more commands. The NFC communicators 15 and 30 may be configured to operate according to an active communications mode and/or a passive communications mode. The NFC operational component 16 modulates its corresponding information onto a first carrier wave, referred to as a modulated carrier wave, and generates a first magnetic field by applying the modulated carrier wave to the antenna 18. The NFC operational component 16 ceases to generate the first magnetic field after transferring the information to the NFC communicator 30 in the active communications mode. Alternatively, in the passive communications mode, the NFC operational component 16 continues to apply the first carrier wave without the information to the antenna 18, referred to as an unmodulated carrier wave, once the information has been transferred to the NFC communicator 30.

The antenna 18 is sufficiently proximate to the antenna 33 such that a communication from the NFC communicator 15 is inductively coupled onto the antenna 33. The NFC operational component 31 demodulates the communication from the NFC communicator 15 to recover the information. The NFC operational component 31 may respond to the information by modulating its corresponding information onto a second carrier wave and generating a second magnetic field by applying this modulated carrier wave to the antenna 33 in the active communications mode. Alternatively, the NFC operational component 31 may respond to the information by modulating the first carrier wave that is inductively coupled onto the antenna 33 with its corresponding information in the passive communications mode.

The NFC communicators 15 and 30 are coupled to the mobile telephone and portable computer functionality 10 and 20, respectively, to enable data and/or control commands to be sent between the NFC communicators 15 and 30 and the mobile telephone 1 or the portable computer 2, respectively, and to enable user input to these NFC communicators. Communication between the user interface 3 and 21 and the NFC communicator 15 and 30 is via the portable computer functionality 10 and 20, respectively.

The NFC communicator 15 and 30 also include a power deriver 19 and 34, respectively. The power deriver 19 and 34 may represent power supplies within the mobile telephone 1 or the portable computer 2 or specific to the NFC communicators 15 and 30, for example a button cell battery, or other small battery. The power derivers 19 and 34 may include a coupling to derive power from the corresponding device chargeable battery 11 and 25 i.e., the primary power supply. The power derivers 19 and 34 may also harvest a power source from a communications signal to adequately operate the NFC communicator 15 and 30, respectively. In the interest of simplicity, power supply couplings from the power deriver 19 and 34 to other components of the mobile telephone 1 and the portable computer 2, respectively, are not shown in FIG. 1.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device. As another possibility, the NFC communicator 15 and NFC communicator 30 may be comprised within or coupled to a peripheral device, for example in the form of a smart card or other secure element which may be stand alone or comprised within or intended to be inserted into another electrical device. For example, a SIM card for use in a mobile telephone. As a further possibility, such peripheral devices may comprise interfacing systems or protocols such as the single wire protocol.

Also, rather than being incorporated within the host device, the NFC communicator 15 and 30 may be associated with the host device, for example, by a wired and/or wireless coupling. In such a case, a housing of the NFC communicator 15 and 30 may be physically separate from or may be attached to the housing of the host device. In the latter case, the attachment may be permanent once made and/or the NFC communicator 15 and 30 may be removable. For example, the NFC communicator 15 and 30 may be housed within: a housing attachable to another device; a housing portion, such as a fascia of the NFC communicator 15 and 30 or another device; an access card; and/or may have a housing shaped and/or configured to look like a smart card. For example, the NFC communicator 15 and 30 may be coupled to a larger device by way of a communications link such as, for example, a USB link, and/or may be provided as a card (for example a PCMCIA card or a card that looks like a smart card) which can be received in an appropriate slot of the larger or host device.

In addition, one or both of the NFC communicators 15 and 30 may be a standalone NFC enabled device, that is it may have no functionality beyond its NFC communications functionality.

An Exemplary NFC Enabled Device

Figure 2:
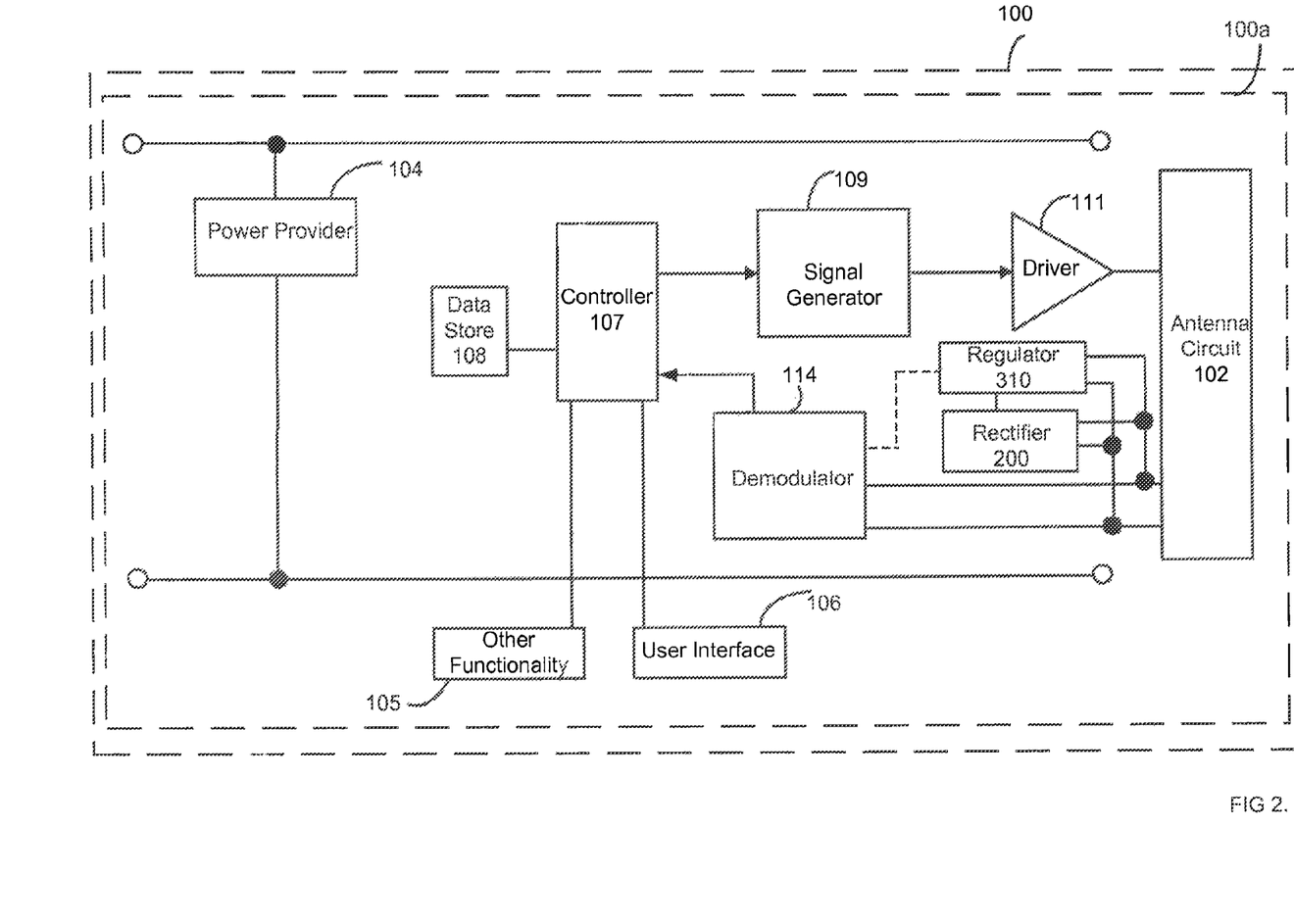
FIG. 2 illustrates a block diagram of a NFC enabled device according to an exemplary embodiment of the invention.

FIG. 2 shows a functional block diagram of an NFC enabled device 100 in accordance with the invention to illustrate in greater detail one way in which the NFC operational components of an NFC enabled device embodying the invention may be implemented.

In this example, the NFC enabled device 100 comprises an NFC communicator 100a having NFC operational components including an antenna circuit 102, power provider 104, controller 107, data store 108, signal generator 109 and demodulator 114.

The power provider 104 may be any one or more of the types of power providers discussed above. In the interests of simplicity, power supply couplings from the power provider 104 to other components are not shown in FIG. 2.

The NFC enabled device 100 may or may not also have and/or be capable of being connected and/or coupled with at least one of other functionality 105 (for example functionality of a host device or peripheral device such as described above) and a user interface 106.

The NFC operational components include a demodulator 114 coupled between the antenna circuit 102 and the controller 107 for demodulating a modulated RF signal inductively coupled to the antenna circuit 102 from another NFC enabled device in near field range and for supplying the extracted data to the controller 107 for processing. Rectifier 200 is coupled to provide a rectified output to regulator 310. Rectifier 200 and regulator 310 are coupled to the outputs AC1 and AC2 of the antenna circuit. The regulator 310 sets or regulates a voltage supply level (pin voltage) and the rectifier 200 provides rectified voltage to remainder of NFC circuit. The regulator 310 sets or regulates the voltage between the outputs AC1 and AC2 of the antenna circuit based on the voltage supply level (pin voltage) provided by the rectifier 200. As shown, the demodulator 114 is coupled to the antenna circuit outputs AC1 and AC2. As another possibility, as shown in dashed line in FIG. 2, the demodulator may receive its input from the regulator 310. As a further possibility, the demodulator may receive its input from the rectifier 200.

Together the rectifier 200 and regulator 310 protect the NFC operational components from high voltages received at antenna circuit 102. For example, the regulator may limit the voltage to 3.3 volts. Any suitable regulator and rectification circuit can be used for this. The NFC operational components may also include an amplifier for amplifying an RF signal inductively coupled to the antenna circuit 102.

In addition, the NFC operational components include components for enabling modulation of an RF signal to enable data to be communicated to another NFC enabled device in near field range of the NFC communicator 100*a*. As shown in FIG. 2, these components comprise the signal generator 109 coupled via a driver 111 to the antenna circuit 102. In this example, the signal generator 109 causes modulation by gating or switching on and off the RF signal in accordance with the data to be communicated. The NFC communicator 100*a* may use any appropriate modulation scheme that is in accordance with the standards and/or protocols under which the NFC communicator 100*a* operates. As another possibility a separate or further signal controller may be incorporated within the NFC operational components to control modulation of the signal generated by the signal generator 109 in accordance with data or instructions received from the controller 107.

The NFC operational components also include the controller 107 for controlling overall operation of the NFC communicator 100*a*. The controller 107 is coupled to the data store 108 for storing data (information and/or control data) to be transmitted from and/or data received by the NFC enabled device. The controller 107 may be a microprocessor, for example a RISC processor or other microprocessor or a state machine. Program instructions for programming the controller and/or control data for communication to another NFC enabled device may be stored in an internal memory of the controller and/or the data store.

The NFC communicator 100*a* may operate in an initiator mode (that is as an initiating NFC communicator) and/or a target mode (that is as a responding NFC communicator), dependent on the mode to which the NFC communicator 100*a* is set. The mode may be determined by the controller 107 and/or may be determined in dependence on the nature of a received near field RF signal. When in initiator mode, the NFC communicator 100*a* initiates communications with any compatible responding NFC enabled device (for example an NFC enabled device in target mode or an RFID tag or transponder) that is in its near field range, while when in target mode the NFC communicator 100*a* waits for a communication from a compatible initiating NFC enabled device (for example an NFC enabled device in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693. NFC enabled devices commonly operate at or around 13.56 MHz.

When in initiator and/or target mode, the NFC communicator 100*a* may communicate in accordance with an active or passive protocol. When using an active protocol, the NFC communicator 100*a* will transmit an RF field and following, completion of its data communication turn off its RF field. The responding NFC enabled device (target) will then transmit its own RF field and data before again turning off the RF field and so on. When using a passive protocol the NFC communicator 100*a* (initiator) will transmit and maintain its RF field throughout the entire communication sequence. The protocol used will depend on instructions received from the controller 107 and the response received from a responding NFC enabled device.

In FIG. 2, control of operation of the NFC communicator 100*a* is through the controller 107. As another possibility where the NFC communicator 100*a* is comprised as part of a host device, control of the operation of the NFC communicator 100*a* may be directed by the host device, for example through other functionality 105. In such circumstances, all or part of the control may be provided by other functionality 105. For example, the controller 107 may control modulation and modulation protocols whereas the data to be transmitted may be provided by other functionality 105.

The NFC communicator 100*a* also comprises an antenna circuit 102. The design of the antenna circuit will depend on the NFC communicator 100*a* and the environment in which it operates. For example, the antenna circuit 102 may be in the form described for co-pending international patent application number PCT/GB2008/000992 (which claims priority from GB 0705635.1).

Examples of regulators that may be used in the NFC communicator 100*a* such as that shown in FIG. 2 will now be described.

A First Exemplary Voltage Regulator

Figure 3:
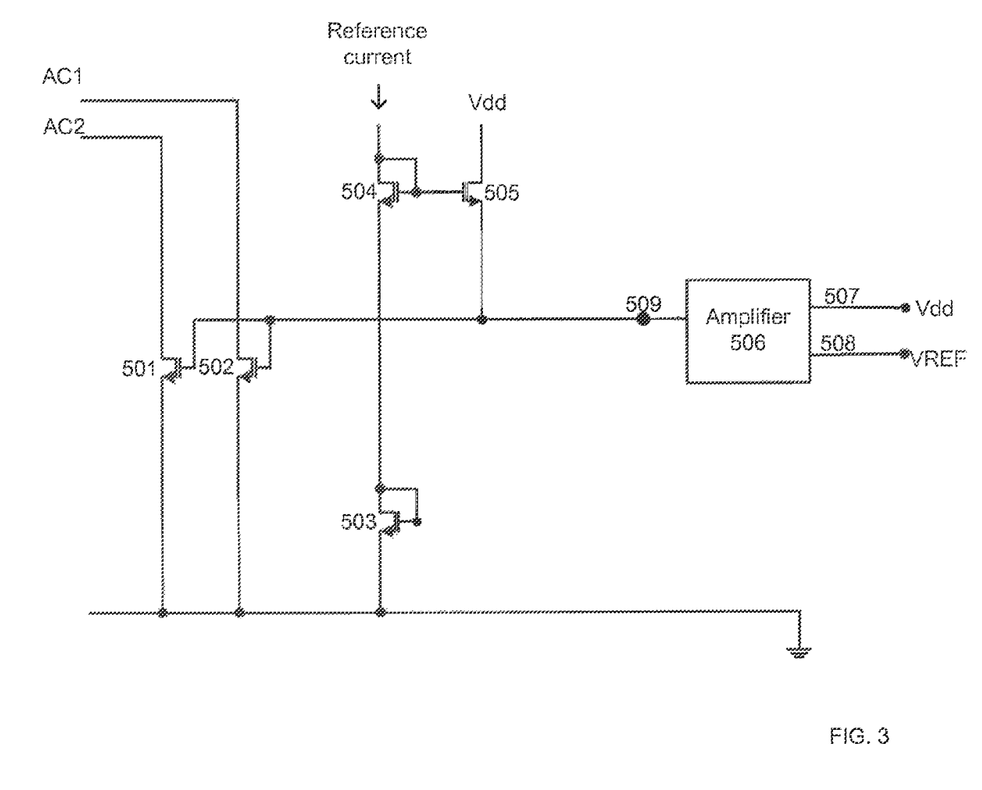
FIG. 3 illustrates a block diagram of a voltage regulator according to an exemplary embodiment of the invention.

FIG. 3 shows a regulator according to an example of the invention.

The example of FIG. 3 shows a voltage regulator comprising: transistors 501, 502, 503, 504, and 505; amplifier 506; a ground and/or reference voltage connection; a reference current source; and two regulator connectors AC1 and AC2. In the interests of clarity not all components or connections, for example power supply connections, have been shown. In this example the Transistors 501, 502, 503, 504 and 505 are transistors having identical or at least substantially identical characteristics, for example identical threshold voltages.

Amplifier 506 has two input terminals 507 and 508 and an output terminal 509. Input terminal 507 is coupled to the voltage supply level (pin voltage) Vdd provided by the rectifier and input terminal 508 is coupled to a reference voltage VREF. Each of transistors 501, 502, 503, 504, and 505 have a first and second main electrode and a control electrode.

Transistors 501 and 502 provide voltage controlled impedances coupling respective regulator connectors AC1 and AC2 to ground. The control electrodes of 501 and 502 are coupled to the output terminal 509 of amplifier 506. The control electrode and the first main electrode of transistor 504 are both coupled to the control electrode of transistor 505 and to a reference current source. The second main electrode of transistor 504 is coupled to the control electrode and the first main electrode of transistor 503. The second main electrode of transistor 503 is coupled to a ground or reference voltage connection. The first main electrode of transistor 505 is coupled to the local supply (or as another possibility to a current source) and the second main electrode of transistor 505 is coupled to the output terminal 509 of amplifier 506.

The transistors 504 and 505 form a current mirror, the current between the first and second main electrodes of transistor 505 mirrors the current between the first and second main electrodes of 504. The voltage drop across the first and second main electrodes of transistor 503 is the threshold voltage of the transistor 503, for example 0.4V. The same is true of transistor 504 and of transistor 505, because transistor 505 mirrors the current passed by transistor 504. In other words transistor 505 will draw the current required to hold the amplifier output 509, and the control electrodes of 501 and 502, at the threshold voltage of transistor 503.

FIG. 3 depicts an arrangement in which amplifier 506 is used in combination with a voltage setter 503, 504, 505 to provide a control voltage based on the difference between Vdd and VREF wherein the control voltage is not less than the threshold voltage of shunt elements 501 and 502. In another example voltage setting functionality is included in amplifier 506.

A Second Exemplary Voltage Regulator

Figure 4:
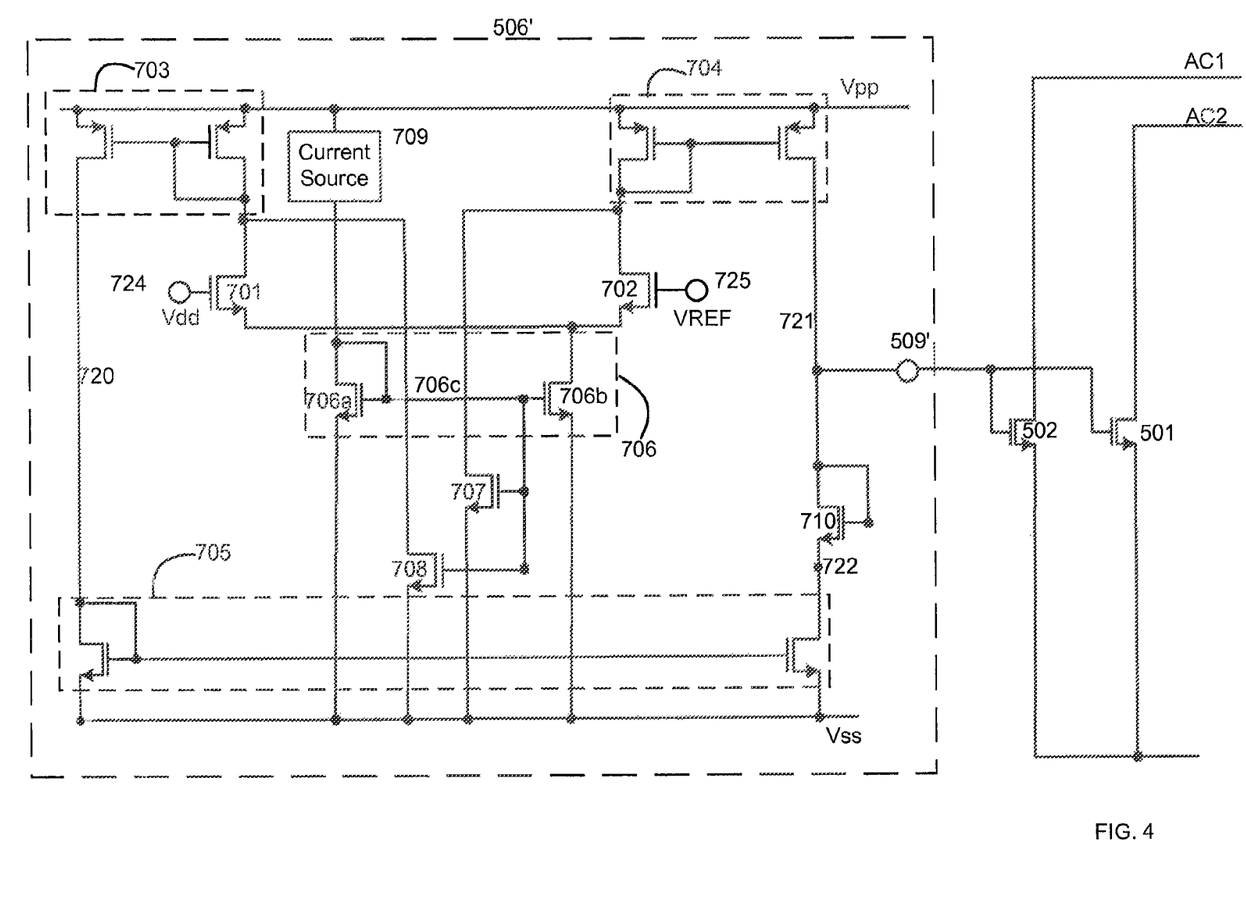
FIG. 4 illustrates a block diagram of a second voltage regulator according to an exemplary embodiment of the invention.

FIG. 4 shows components of another regulator according to the invention, in the interests of clarity not all components or connections have been shown.

In the example of FIG. 4, an amplifier 506' includes a voltage setter to provide a control voltage not less than the threshold voltage of shunt elements 501 and 502.

As will be clear to one of skill in the art, the example of FIG. 4 provides a differential amplifier 506' comprising a differential transistor pair 701 and 702 and a configuration of current mirrors 703, 704 and 705. This amplifier is ancillary to the invention and will not be described in detail. Any appropriate form of amplifier could be used.

The control electrodes of transistors 701 and 702 serve as respective amplifier inputs 724 and 725. Amplifier input 724 is coupled to voltage supply level (pin voltage) Vdd and amplifier input 725 is coupled to a reference voltage VREF. Current source 709 is coupled to a supply voltage Vpp. The current from the current source 709 sets the bleed and tail currents in the amplifier. Current mirror 706 comprises transistors 706a and 706b each having first and second main electrodes and at least one control electrode. The first and second main electrodes of 706a and 706b provide the conduction paths or "legs" of the current mirror. The control and first main electrode of transistor 706a are coupled to the control electrode of 706b to provide a "spine". Leg 706a couples current source 709 to Vss and leg 706b couples the second main electrode of 701 and 702 (the "tail" of the differential pair 701, 702) to Vss.

The first main electrode of transistor 707 is coupled to the first main electrode of transistor 702. The second main electrode of transistor 707 is coupled to Vss. The control electrode of transistor 707 is coupled to the control electrodes of 706a and 706b of current mirror 706.

The first main electrode of transistor 708 is coupled to the first main electrode of transistor 701. The second main electrode of transistor 708 is coupled to Vss. The control electrode of transistor 708 is coupled to the control electrodes of 706a and 706b of current mirror 706.

Transistors 501 and 502 provide voltage controlled impedances coupling respective regulator connectors AC1 and AC2 to ground. The control electrodes of 501 and 502 are coupled to the output terminal 509' of amplifier 506'.

The control electrode and first main electrode of transistor 710 is coupled to amplifier output 509' and current mirror 704.

Current source 709 sets the current in the amplifier tail 706b and in the transistors 707 and 708. The configuration of 707 and 708 means that they draw "bleed-currents" from current mirrors 703 and 704. These bleed currents are present independent of the presence or absence of a voltage difference between the amplifier inputs 724 and 725. This means that there is always some current flowing through amplifier legs 720 and 721. Passing this current through transistor 710 ensures that the voltage difference between amplifier output 509' and the point 722 is maintained at a voltage not less than the threshold voltage of transistor 710.

As is known in the art there is a transient period or transition time associated with the time taken for a transistor to move from a non-conducting to a conducting state. In the example of FIG. 3, voltage controlled shunt impedances are provided by transistors 501 and 502.

Two examples of the invention have been described, as will be appreciated by the skilled practitioner these are linked by a single inventive principle.

The principle common to the described examples is that, in a shunt voltage regulator, the voltage at the control electrode of the regulating transistor (shunt impedance) should be maintained at a voltage not less than the threshold voltage of that regulating transistor.

Advantageously this enables the voltage controlled impedance to be controlled more quickly. This is because, where the control voltage is manipulated in this way a conduction channel is always present, or on the point of being formed, in the shunt impedance so conduction can start quickly. In addition, because the voltage at the control electrode is at or near the threshold voltage the response time required to start regulating by controlling the shunt gate is reduced. Therefore, voltage regulators which are examples of the invention respond more rapidly to changes in control voltage and "overshoot" of the regulated voltage is reduced. This means that components of NFC communicator are protected more effectively from damaging voltages. The use of this method means that the shunt is never hard off and at high impedance and then has to cross-over into lower shunted impedance, that is there is no sudden step change in impedance.

Current mirrors depicted in the drawings have been shown as having a one to one ratio, as will be appreciated other ratios may be used. For example, single transistors may be replaced by appropriate configurations comprising multiple transistors. As will be understood by the skilled practitioner, any appropriate three terminal switch may be used in place of the depicted NMOS and PMOS transistors. For example, where NMOS or PMOS transistors have been shown these may be replaced by appropriate configurations of different MOS transistors, bipolar transistors or other suitable three terminal switch components.

As will be appreciated by the skilled practitioner, the term threshold voltage refers to the voltage required to form a conduction channel in a MOS transistor and the actual voltage will vary depending on operational and geometric constraints. In other examples, the term threshold voltage should be understood to mean the voltage required to switch on any voltage controlled impedance. In addition, where bipolar transistors are used the threshold voltage should be understood to mean the switch on voltage of the bipolar transistor, for example 0.7 Volts.

Where as described above transistors are said to have substantially identical characteristics, this may mean that they are matched, that is that they are manufactured using the same process conditions (they may be integrated with one another) and in the case of MOS transistors may, in addition to having the same threshold voltages, have the same channel width-to-length (W/L) ratios as well or channel width-to-length (W/L) ratios in a known ratio to one another.

The regulators shown in FIGS. 3 and 4 may be implemented in the NFC communicator shown in FIG. 2 to provide, although not shown in FIG. 2, a rectified power supply for other functionality of the NFC communicator. The various supply voltages and current sources required by the regulators shown in FIGS. 3 and 4 may be provided by appropriate supply voltages and current sources available within the NFC communicator. AC1 and AC2 would in these circumstances be provided by the antenna circuit 102 outputs and the inputs to the amplifier (inputs 507 and 508 in FIG. 3 and inputs 724 and 725 in FIG. 4) by a voltage to be regulated and a reference voltage, respectively. Examples of how the inputs to the amplifier may be provided are described in UK Patent Application No. 0722516.2 and the corresponding PCT application PCT/GB2008/003842 which claims priority therefrom, the whole contents of both of which are hereby incorporated by reference. It will be apparent to the skilled man that the same system could be used in any near field RF communicator requiring a regulator and at any appropriate location in a near field RF communicator where regulation may be required.

CONCLUSION

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A near field communications (NFC) enabled device, comprising:
   a rectifier configured to rectify an output of an antenna circuit to provide a rectified output; and
   a regulator configured to regulate an output of the antenna circuit based upon the rectified output, the regulator comprising:
      an amplifier configured to determine a difference between the rectified output and a reference voltage to provide a control signal, the amplifier comprising:
         a differential transistor pair, wherein each transistor of the differential transistor pair configured to be a respective amplifier input,
         a first transistor and a second transistor configured to draw a bleed current,
         a first current mirror configured to couple the differential transistor pair to a voltage source;
         a second current mirror and a third current mirror respectively coupled to the first transistor and the second transistor; and
      a voltage setter configured to combine the bleed current with the control signal; and
      a plurality of voltage controlled impedances configured to regulate the output of the antenna circuit based upon an output of the voltage setter, wherein:
         the bleed current causes the plurality of voltage controlled impedances to be active; and
         each of the plurality of voltage controlled impedances couples a respective output of an antenna circuit to ground.

2. The NFC enabled device of claim 1, wherein each of the plurality of voltage controlled impedances comprises:
   a metal oxide semiconductor field-effect transistor (MOSFET); or
   a bipolar junction transistor (BJT).

3. The NFC enabled device of claim 1, wherein the voltage setter comprises:
   a third transistor and a fourth transistor configured as a current mirror, the fourth transistor being configured to mirror a reference current that flows through the third transistor to provide the bleed current.

4. The NFC enabled device of claim 3, wherein the voltage setter further comprises:
   a fifth transistor configured to cause the reference current to flow through the first transistor.

5. The NFC enabled device of claim 4, wherein the output of the voltage setter is greater than a threshold voltage of the fifth transistor.

6. The NFC enabled device of claim 5, wherein thresholds of the plurality of voltage controlled impedances are substantially equal to the threshold voltage of the fifth transistor.

7. The NFC enabled device of claim 4, wherein the voltage setter is further configured to ensure that a voltage difference between the control signal and an electrode of one of the plurality of voltage controlled impedances is not less than a threshold voltage of the fifth transistor.

8. The NFC enabled device of claim 1, wherein the amplifier comprises:
   a differential amplifier configured to determine the difference between the rectified output and the reference voltage.

9. The NFC enabled device of claim 1, wherein the antenna circuit is configured to receive an inductively coupled communication to provide a recovered communications signal.

10. The NFC enabled device of claim 9, wherein the regulator is further configured to regulate a power level of the recovered communications signal.

11. The NFC enabled device of claim 10, further comprising:
    a demodulator configured to demodulate the recovered communication signal to provide recovered information.

12. The NFC enabled device of claim 1, wherein the amplifier further comprises:
    a current source configured to set the bleed current and a tail current in the amplifier;
    a fourth current mirror configured to draw a current from the second and third current mirrors; and
    a third transistor coupled between the third current mirror and the fourth current mirror.

13. A near field communications (NFC) enabled device, comprising:
    a receiver configured to receive a communications signal;
    a rectifier configured to rectify an output of the receiver to provide a rectified output; and a regulator configured to regulate an output of the receiver based upon the rectified output, the regulator comprising:
   an amplifier configured to a difference between the rectified output and a reference voltage to provide a control signal, the amplifier comprising:
      a differential transistor pair, wherein each transistor of the differential transistor pair is configured to be a respective amplifier input,
      a first transistor and a second transistor configured to draw a bleed current,
      a first current mirror configured to couple the differential transistor pair to a voltage source;
      a second current mirror and a third current mirror respectively coupled to the first transistor and the second transistor; and
   a voltage setter configured to combine a bleed current with the control signal; and
   a plurality of voltage controlled impedances configured to regulate the output of the receiver based upon an output of the voltage setter, wherein:
      the bleed current causes the plurality of voltage controlled impedances to be active; and
      each of the plurality of voltage controlled impedances couples a respective output of an antenna circuit to ground.

14. The NFC enabled device of claim 13, wherein each of the plurality of voltage controlled impedances comprises:
   a metal oxide semiconductor field-effect transistor (MOSFET); or
   a bipolar junction transistor (BIT).

15. The NFC enabled device of claim 13, wherein the receiver is configured to receive an inductively coupled communication to provide a recovered communications signal.

16. The NFC enabled device of claim 15, wherein the regulator is configured to regulate a power level of the recovered communications signal.

17. The NFC enabled device of claim 16, further comprising:
   a demodulator configured to demodulate the recovered communication signal to provide recovered information.

18. The NFC enabled device of claim 13, wherein the amplifier further comprises:
   a current source configured to set the bleed current and a tail current in the amplifier;
   a fourth current mirror configured to draw a current from the second and third current mirrors; and
   a third transistor coupled between the third current mirror and the fourth current mirror.

19. A near field communications (NFC) enabled device, comprising:
   a host device; and
   a NFC device coupled to the host device, the NFC device comprising:
      a rectifier configured to rectify an output of an antenna circuit to provide a rectified output; and
      a regulator configured to regulate an output of the antenna circuit based upon the rectified output, the regulator comprising:
         an amplifier configured to determine a difference between the rectified output and a reference voltage to provide a control signal, the amplifier comprising:
            a differential transistor pair, wherein each transistor of the differential transistor pair is configured to be a respective amplifier input,
            a first transistor and a second transistor configured to draw a bleed current,
            a first current mirror configured to couple the differential transistor pair to a voltage source;
            a second current mirror and a third current mirror respectively coupled to the first transistor and the second transistor; and
         a voltage setter configured to combine a bleed current with the control signal; and
         a plurality of voltage controlled impedances configured to regulate the output of the antenna circuit based upon an output of the voltage setter, wherein:
            the bleed current causes the plurality of voltage controlled impedances to be active; and
            each of the plurality of voltage controlled impedances couples a respective output of an antenna circuit to ground.

20. The NFC enabled device of claim 19, wherein the host device comprises a mobile telephone.

21. The NFC enabled device of claim 19, wherein the host device comprises a portable computer.

22. The NFC enabled device of claim 19, wherein the host device comprises:
   a long range communicator configured to transmit or receive a communications signal outside a maximum operable range of NFC.

23. The NFC enabled device of claim 19, wherein the amplifier further comprises:
   a current source configured to set the bleed current and a tail current in the amplifier;
   a fourth current mirror configured to draw a current from the second and the third current mirrors; and
   a third transistor coupled between the third current mirror and the fourth current mirror.

* * * * *